March 21, 1967  H. W. BOTELER  3,310,279
DIAPHRAGM VALVE AND DIAPHRAGM THEREFOR
Filed May 14, 1964  4 Sheets-Sheet 1

INVENTOR.
HENRY W. BOTELER
BY
ATTORNEY

INVENTOR.
HENRY W. BOTELER
BY
ATTORNEY

INVENTOR.
HENRY W. BOTELER
BY
ATTORNEY

March 21, 1967     H. W. BOTELER     3,310,279
DIAPHRAGM VALVE AND DIAPHRAGM THEREFOR Filed May 14, 1964     4 Sheets-Sheet 4

INVENTOR.
HENRY W. BOTELER
BY
ATTORNEY

United States Patent Office

3,310,279
Patented Mar. 21, 1967

---

3,310,279
DIAPHRAGM VALVE AND DIAPHRAGM THEREFOR
Henry W. Boteler, East Greenwich, R.I., assignor to Grinnell Corporation, Providence, R.I., a corporation of Delaware
Filed May 14, 1964, Ser. No. 367,298
11 Claims. (Cl. 251—331)

This invention relates to improvements in diaphragm valves. More particularly it has to do with improvements in diaphragms for such valves and in the novel combination of such improved diaphragms with other valve components.

Every diaphragm valve diaphragm represents a compromise between as much flexibility as possible on the one hand and as much strength and imperviousness as possible on the other hand. The flexibility is required to enable certain portions of the diaphragm to be moved with respect to other portions between the valve-open and valve-closed positions upon the application of reasonable moving force and without undue stress in the diaphragm material. The strength and imperviousness is required so that the diaphragm will resist bursting under the pressure of the controlled fluid, will resist corrosion by chemical action and will resist abrasion by suspended solids.

Great strides have been made in the diaphragm field by the development of new diaphragm materials and by the introduction of new structural features. The present invention falls in the latter category because it involves the employment of a special diaphragm shape per se and a special cooperation between this diaphragm shape and the structure of the valve body. With this invention a surprisingly better compromise of flexibility, strength and imperviousness is achieved than in the prior art.

The type of diaphragm valve in which the present invention finds by far its greatest utility is that (1) in which the flow passageway through the body is essentially cylindrical and communicates with a diaphragm opening on one side of the body, (2) in which part of seating for the closure member is on walls sloping inwardly from such opening toward the side of the passageway opposite the opening and is closely adjacent the intersections of the passageway with these walls, and (3) in which part of the seating extends across the side of the passageway opposite the opening. An example of one construction within this general type is shown in U.S. Patent No. 2,963,266, of Dec. 6, 1960. One result of this type of seating configuration is that the diaphragm has a deep bulge, and no part of the clamped diaphragm periphery contributes to the blocking of flow in the closed position.

Conventionally, the clamped diaphragm periphery in diaphragm valves lies in a flat plane, but whether in such a plane or otherwise, a deep diaphragm bulge indicates substantial movement of the central bulged portion relative to the periphery when the diaphragm is actuated between open and closed positions. As a consequence a severe flexing action occurs in the annular skirt portion of the diaphragm between the clamped margin and the diaphragm center (which is normally thick and secured to a compressor). This flexing action results in substantial bending of the diaphragm material, particularly when the skirt portion is made as thick as possible to withstand high pressures, and it is the constant repetition of this flexing which ultimately causes diaphragm rupture.

A recent development in this kind of valve is the selection of diaphragm and seating proportions so that there is always a U-bend or fold in the flexible diaphragm skirt portion, which fold extends away from the diaphragm opening. The result of this development is that even in the closed position of the valve, in which the central diaphragm portion extends down into engagement with the seating, there is an outwardly extending fold in the skirt portion. The fold is also present in the fully open position of the diaphragm, and as a consequence the skirt portion is subjected to an "inside-out" or "rolling-sleeve" action in which the bend of the fold moves radially inwardly or outwardly, as the case may be, along the skirt portion. However, because the fold is always present there is no reversal of this bend or of the bends joining the skirt portion to the central and peripheral diaphragm portions.

This above-mentioned recent development does not require that the fold be present in the diaphragm when the diaphragm is initially formed. The advantages of the fold can be realized to some extent, at least, even when the fold is produced by the assembly of the diaphragm with the other valve parts. For example, the diaphragm could be initially formed with the central and skirt portion bulging entirely on one side of the peripheral portion and with the fold appearing as a result of the diaphragm being installed in a valve having a distance between the diaphragm clamping flange and seating which is shorter than the depth of the bulge.

As a practical matter the resilient member materials which are in use today receive their initial form by being molded from a raw form with the application of heat and pressure, and in thus forming the closure member with the fold already present, as is preferred, it has been discovered that a surprising and unexpected advantage can be achieved with respect to the condition of the usual fabric reinforcement employed in these diaphragms and similar closure members. Such fabric customarily comprises one or more layers of natural or synthetic fibre cloth located about mid-way between the surfaces of the flexing diaphragm portions and extending into the non-flexing portions. The purpose of the fabric is to help the resilient diaphragm material resist bursting under the pressures of the controlled fluids and to retard creep of the resilient material under the compression which is encountered at the peripheral portions and at the seating.

When the diaphragms are molded the fabric is introduced by being placed in the molds along with the raw resilient material. More particularly, the fabric is usually in the form of ordinary flat sheets of woven cloth which are somewhat larger than the diaphragm and are merely laid across the female part of the mold with suitable quantities of the raw resilient material between them and on either side thereof. When the mold is closed the resilient material flows to all parts of the cavity, moving the fabric into the diaphragm contour with the intention that the fabric be finally located centrally between the flexible skirt portion surfaces and that the layers of resilient material on the sides of the fabric be of generally uniform thickness.

In the kind of valve referred to above, the amount of fabric deformation required to cause the flat fabric sheet to take the shape of a deep diaphragm bulge is substantial, and even where nylon has been used because it stretches relatively readily when heated, the final location and condition of the fabric in these prior art diaphragms has not been satisfactory where the bulge is all on one side of the diaphragm periphery. For example, the fabric has been ruptured by the molding operation itself or so weakened that it could not perform its desired function.

I have discovered, however, that by molding these deeply bulged diaphragms with the skirt portion having a fold extending toward the side of the diaphragm opposite the side which is adapted to engage a seating surface, the fabric is not as severely stressed for any given length of the skirt portion. This discovery was unexpected because the total skirt length measured outwardly along the plane intermediate its surfaces between the heavy central portion and the periphery would be the same with this shape as with the conventional prior art constructions in which the bulge lies entirely on the same side of the periphery as the seating. It would seem, therefore, that as much stretching of the fabric during molding would be required with a fold as described as in these conventional constructions. However, the decrease in manufacturing rejects and the improvements in diaphragm life with the novel molding shape are outstanding.

It is believed to be a special disposition of the fabric within the resilient material which accounts for these improvements. In the case of the prior art diaphragms which are deeply bulged entirely on the seating side of the periphery there are two bends to which the fabric is subjected and during the molding operation, and the fabric, in resisting deformation, endeavors to shift slightly to the insides of these bends when the molds are being closed. The provision of raw resilient material on either side of each fabric piece prevents the fabric piece from actually reaching the diaphragm surfaces at these bends, and the shifting described results in the fabric radial length (length measured outwardly along the fabric) being somewhat less than the corresponding length of the center plane of the flexible diaphragm portion. This tends to reduce the fabric deformation, but the fabric is still considerably stretched and deformed. In the case of the present invention, however, the diaphragm is formed in such a configuration that there are three bends which the fabric "short-cuts" during molding, so that the fabric is stretched substantially less than in the prior art where there have only been two such bends. It is believed that this substantial reduction in fabric deformation during molding accounts for the remarkable improvement in diaphragm life.

Another difficulty has been that in a valve of the kind referred to the open and closed positions have been so dissimilar that in flexing the diaphragm from one to the other substantial stresses within the resilient diaphragm material have resulted. The molded-in fold construction of this invention preferably takes the shape of the diaphragm in one of the intermediate positions of the valve between the open and closed extremes. This further feature has added advantage of limiting the amount of flexing of the resilient material in the position of greatest flexing which may be the fully open or the fully closed position. Thus, the amount of flexing in any position is dependent upon the shape of the diaphragm in its relaxed configuration. In the case of many flexible bodies including diaphragm valve diaphragms the elasticity of the material will tend to return them to their original shapes after external deforming forces have been removed. For diaphragm valve diaphragms these shapes are usually the molded shapes, and in the past it has been customary to mold the diaphragm valve diaphragms in either their valve-open or valve-closed positions.

I have discovered that by molding the diaphragm in a shape approximating the configuration of a diaphragm in an intermediate valve position (substantially different than either the fully open or fully closed positions) the stresses produced in the diaphragm material when the valve is operated to either extreme position are minimized and greater life results.

Accordingly, one object of the present invention is to provide for valves of the diaphragm type an annular closure member or diaphragm which has a relatively thin peripheral portion, a much thicker central portion, and a relatively thin intermediate sleeve or skirt portion extending between the peripheral and central portions, in which the diaphragm is formed so that in the unstressed condition the skirt portion curves from the peripheral portion in one direction then curves back upon itself in the opposite direction, in the manner of a sleeve rolled inside-out, and then curves into one surface of the thicker central portion, and, in which there is located between the surfaces of the sleeve portion a fabric reinforcement which short-cuts the three curves, making it closer to the inner surfaces at these curves than to the outer surfaces.

Another object is to provide a diaphragm of the kind described in which there are three bends in the central plane between the intermediate portion surfaces and three corresponding bends in the fabric reinforcement embedded in this resilient material, and in which the bends in the fabric reinforcement provide less of a change in direction than the bends in the plane.

Another object is to provide a diaphragm of the kind described in which the greater part of the intermediate portion is in the form of a fold on one side of the peripheral portion and the greater part of the central portion is on the opposite side of the peripheral portion.

Another object of the present invention is to provide a diaphragm valve in which the diaphragm has a molded or unstressed configuration which is substantially the configuration of the diaphragm when the diaphragm is in a position half-way between its valve-open and valve-closed positions.

Another object is to provide a diaphragm valve of the kind described in which the flexible intermediate sleeve portion of the diaphragm has a fold extending away from the seating in the valve-closed position as well as in other positions.

Another object is to provide a diaphragm valve having a closure member of the kind described and in which the seating is substantially entirely on the body walls which slope inwardly from the diaphragm opening.

Another object is to provide a diaphragm valve and diaphragm whch are inexpensive to manufacture, easy to install and maintain and which provide superior diaphragm life.

Other objects will appear hereinafter.

The best mode in which it has been contemplated applying the principles of the present invention are shown in the accompanying drawings, but these are to be deemed primarily illustrative for it is intended to cover by suitable expression in the appended claims whatever of patentable novelty exists in the invention disclosed.

In the drawings:

FIGURE 1 is a cross-sectioned elevation view of a diaphragm valve diaphragm according to one aspect of the present invention, the diaphragm being shown in its free molded form;

FIGURE 2 is a cross-sectioned end elevation view showing the diaphragm of FIG. 1 installed in a diaphragm valve in which the parts are so formed and located with respect to the diaphragm that, except for the clamping of the diaphragm periphery, the diaphragm is still in its free molded form and the valve is in a position substantially mid-way between open and closed;

Figure 6:
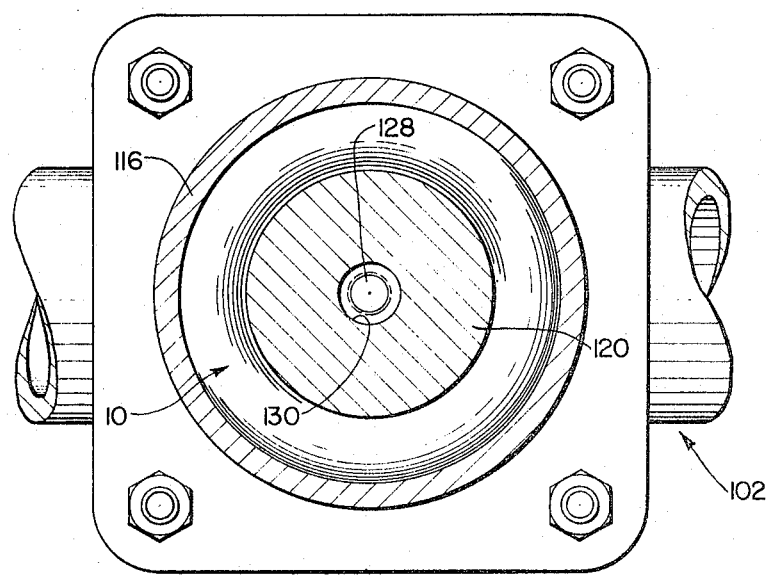
FIGURE 6 is a plan view taken on line 6—6 of FIG. 2.

Referring now more particularly to the drawings, the diaphragm of FIGS. 1 and 6 is preferably molded rubber-like material 10, having embedded therein a layer of fabric reinforcement 11 and the head 12 of a stud 14 having a threaded stem 15. This fabric and stud are introduced into the diaphragm material during the molding operation.

Figure 8:
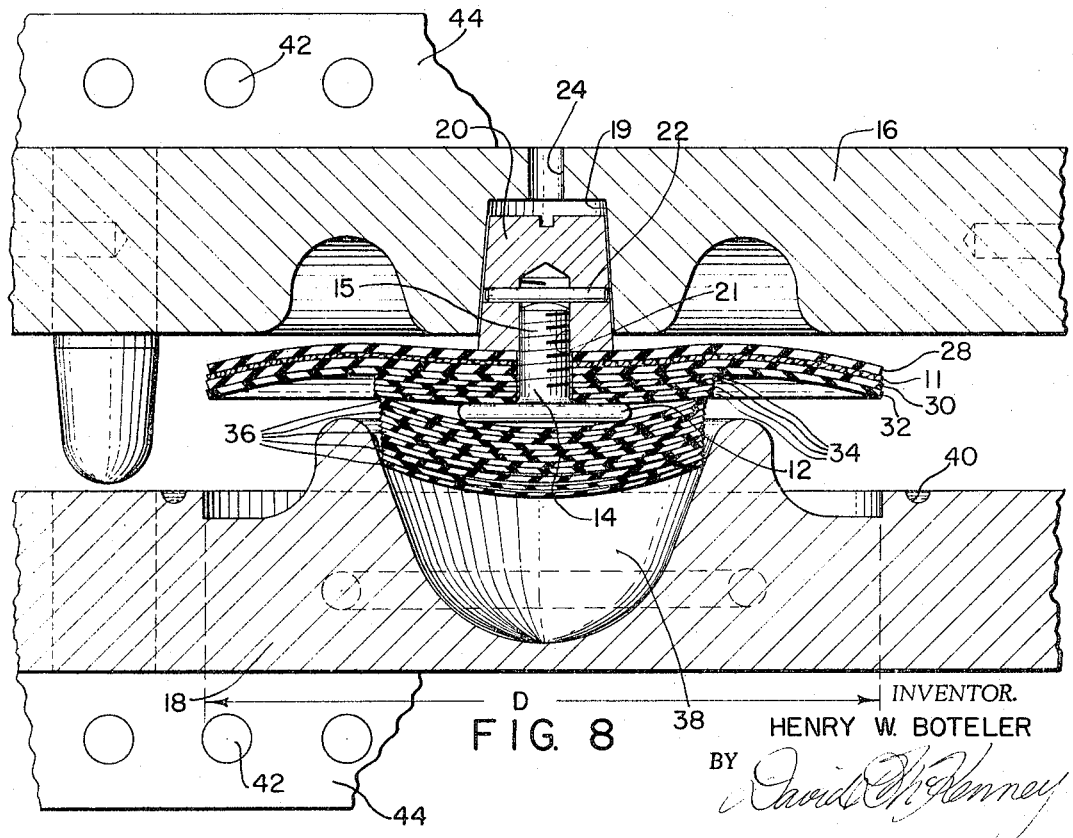

One step in this molding operation is illustrated in FIG. 8 which shows the mold parts 16 and 18 loaded and ready for closing. More particularly, the upper male part 16 has, in addition to the contours of the back side of the diaphragm, a tapered cavity 19 for receiving a tapered insert piece 20 which holds the stud 14 in the proper place in the mold cavity. This insert piece has a threaded opening 21 for the threaded stud stem 15 and also has a cross pin 22 in the opening 21 to set the proper position of the stud with respect to the tapered insert piece 20. In this way the stud is firmly held in the proper position during molding and at the same time the connection between the stud and the male mold part can be easily undone through opening 24 after the molding operation.

The layer of fabric 11 and the pieces of resilient material 28, 30, 32, 34 and 36 are shown in their proper positions prior to closing of the mold. The layer of fabric and some of these pieces of resilient material are apertured and located between the stud head 12 and the mold part 16. The remainder of the pieces are located below the stud head on the female mold part 18. The loose pieces are located as centrally as possible. In plan view all of these pieces have a generally regular shape, for example, a circular shape so that the loading is as uniform as possible.

The fabric layer 11 and the resilient material layers 28, 30, and 32 extend beyond the deeper part 38 of the female mold cavity. The resilient material layers 34 and 36 are smaller and generally fit inside this deeper mold cavity part 38. The amount of resilient material in all of the pieces is crefully chosen so that the total volume slightly exceeds the amount required to fill the cavity, thereby providing some flashing when the mold is closed. This flashing is taken care of by a trough 40 in the mold part 18.

The kind of resilient diaphragm material selected will vary depending upon the use to which the valve is to be put. However, for any service it is necessary for the material to have the ability to retain the shape originally imparted to it and at the same time be deformable from that shape upon the application of reasonable forces. In addition, the material must be dense enough to be impervious to fluids, must have a surface which is abrasion resistent, must be of a composition which does not react with or contaminate fluids which come in contact with it. Finally it must withstand repeated deformations without rupture. Examples of such materials are natural and synthetic rubbers having durometers of about 65, fluorocarbon resins and fluorocabon elastomers.

For the purposes of this description, it wll be assumed that the material of the diaphragm shown in FIGS. 1–6 is polychloroprene prepared and cured in the manner which is in part described below and which will be fully understood by persons skilled in this art. In addition, the fabric 11 which appears in FIG. 1 is assumed to be a nylon cloth of ordinary loose mesh weave (24 x 24 threads per inch).

The layers of polychloroprene shown in FIG. 8 are in a state which requires heat to cure them, and this heat is achieved by heating elements 42 in platens 44 adjacent the mold parts. For example, for this material the mold temperature may be 300° F. and the mold should be closed for about 30 minutes. With the mold cavity dimension D of 5" the piece 28 is circular with a diameter of 5" and a thickness of .070". Pieces 30 and 32 are circular with a diameter of 5", and they have a combined thickness of .120". Pieces 34 are circular with a diameter of 2½", and they have a combined thickness of .185". Pieces 36 are also circular with a diameter of 2½" and a combined thickness of .480".

It will be understood that these dimensions are not critical. They merely represent an example of a way in which a diaphragm according to the present invention can be made. They illustrate particularly well how the fabric 11 is acted upon by forces when the mold is closed.

The diaphragm of FIG. 1 can be considered as having three different portions. The center portion 74 comprises a heavy mass of the resilient material with an outer surface 76 shaped to conform to the seating in the valve which will be described later herein and with an inner surface 78 which can have any convenient shape so long as it provides the center portion with the desired thickness and does not interfere with the operation of the valve compressor also described later herein. In diaphragm illustrated the surface 78 forms an angle 79 with the adjoining surface 80 of the intermediate skirt portion 81 which will be described. The peripheral portion 82 acts as a gasket with opposed parallel surfaces 83 and 84 lying in parallel planes 86 and 88, respectively. The distance between the surfaces 83 and 84 is small compared to the thickness of the center portion 74. The intermediate skirt portion 81 has another surface 94 parallel to surface 80, and these surfaces blend into the peripheral portion surfaces 84 and 80 and also into the center portion surfaces 76 and 78. In thickness the intermediate skirt portion 81 is about the same as the peripheral portion.

The diaphragm is shaped so that as the skirt portion 81 departs from the peripheral portion 82 it curves at 96 to one side of both planes 86 and 88 and then reverses its curve at 98 back toward the central portion which it joins at 100, with surfaces 78 and 80 forming an angle 79.

In FIG. 1 the juncture at 100 is substantially at the level of plane 86. This causes the molded diaphragm shape to be substantially the shape of a half-open diaphragm in a valve which is a feature of the invention. It will be understood, however, that the location of this juncture 100 either above or below this level is within another feature of the invention as long as the curves 96, 98, and 100 are purposely formed into the diaphragm surfaces when it is molded, and the layer of fabric reinforcement 11 short-cuts these curves rather than following the center line between the surfaces of the resilient material. This short-cutting provides less severe stretching and bending of the fabric, and because there are three curves which can be short-cutted in this way the saving in stretching and bending is substantial. The short-cutting is demonstrated by the closeness with which the dotted line 11 approaches the surface 80 at curves 96 and 100 and the surface 94 at curve 98.

FIGURE 2 shows the diaphragm of FIG. 1 mounted in a diaphragm valve. This valve has a body 102 with a generally cylindrical passageway 104 therethrough and a seating 106 surrounding the intersection of this passageway by a conical wall surface 108 which extends inwardly from the diaphragm opening 110 toward the side of the passageway opposite this opening. It is the movement of the diaphragm through this opening and against the seating 106 which blocks the flow of fluid along the passageway. The diaphragm opening 110 is surrounded by a flat flange surface 112 against which the peripheral diaphragm portion 82 is clamped by a corresponding flange surface 114 on the end of a bonnet 116. In addition to clamping the diaphragm periphery as above mentioned, this bonnet serves as a housing for an actuating mechanism 118 which is made up of a compressor 120, a spindle 122, a threaded bushing 124, and a handwheel 126. The compressor 120 is secured to the center of the diaphragm by engagement with the threaded stem 15 of the stud 14 which extends through the diaphragm surface 78. More particularly, a threaded central hole 130 in the bottom end of the compressor receives this threaded stem 15. Around this hole 130 the end of the compressor is shaped to fit the diaphragm surface 78, and the sides 132 of the compressor are sloped in the same manner as the sloped body walls 108. As a result, when the compressor is advanced to seat the diaphragm, it serves to press the diaphragm center 74 and intermediate skirt portion 81 against the seating 106 along all portions thereof. The compressor is provided with slots 134 which slidingly receive webs 136 extending inwardly from the inner surface of the bonnet on opposite sides thereof, and by this interaction vertical movement of the compressor is permitted while rotational movement of the compressor is prevented.

The tendency for the compressor to rotate results from the construction of the remainder of the operating mechanism which includes the pivotal mounting of the compressor 120 on the lower end of the spindle 122 by a pin 138 mounted in a stem hub 140 and journalled in the sides of a hollow boss 142 located at the center of the compressor. This pivotal connection between the compressor and spindle is conventional in valves of this kind and permits a slight self-adjusting rocking of the compressor to seat the diaphragm better during closure. The upper end of the spindle is threaded and thereby engaged in the threaded hollow bushing 124 which in turn is journalled in an opening 144 at the upper end of the bonnet. Retention of the bushing in this opening is accomplished by the cooperation between a flange 146 on the bushing and by the handwheel 126 which is secured to the upper end of the bushing by a set-screw 148. A thrust bearing 150 is located between the bushing flange 146 and the inner bonnet surface surrounding the opening 144.

It will be apparent from the foregoing description that when the handwheel 126 is rotated the bushing 124 is simultaneously rotated and causes the spindle 122 to move up or down inside of the bushing depending on the direction of rotation of the handwheel. This in turn moves the compressor 120 up or down. The friction between the threads of the bushing and spindle imparts a rotational tendency to the spindle and to the compressor attached thereto, but the slots 134 in the compressor and the webs 136 on the bonnet cooperate to prevent such compressor or spindle rotation.

Figure 3:
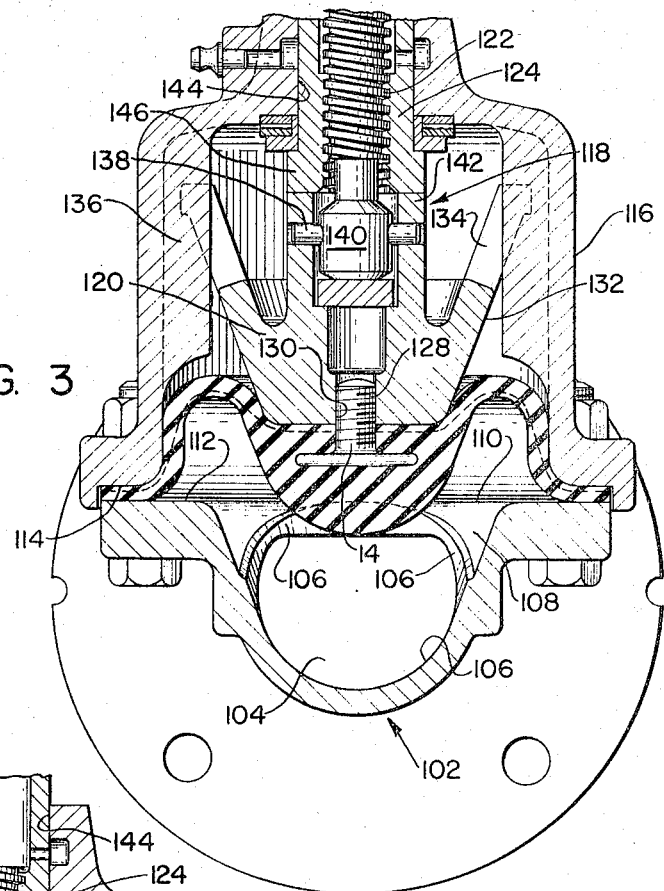
FIGURE 3 is a view like FIG. 2 but showing the diaphragm flexed to move the valve to its fully open position.
Figure 4:
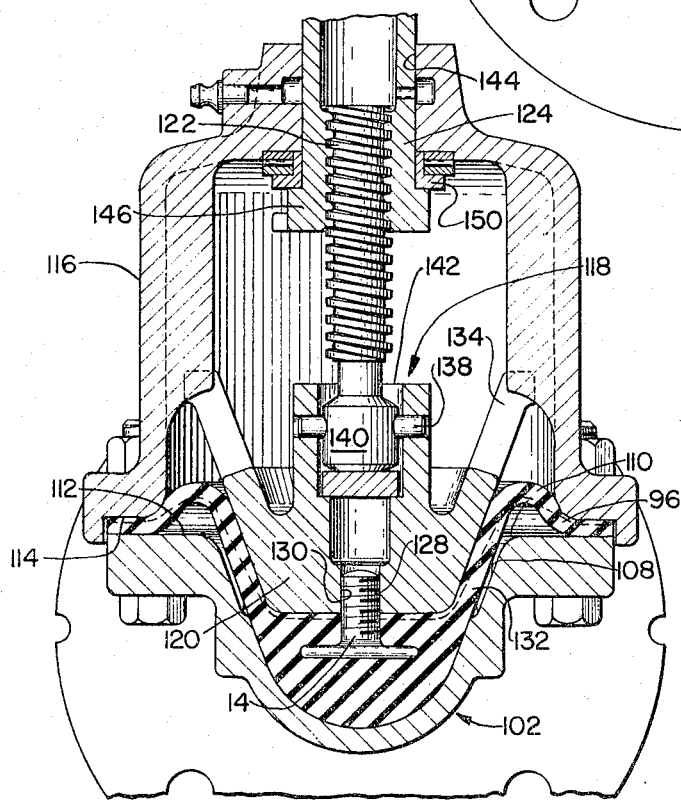
FIGURE 4 is a view like FIG. 3 showing the diaphragm flexed to move the valve to its fully closed position.
Figure 5:
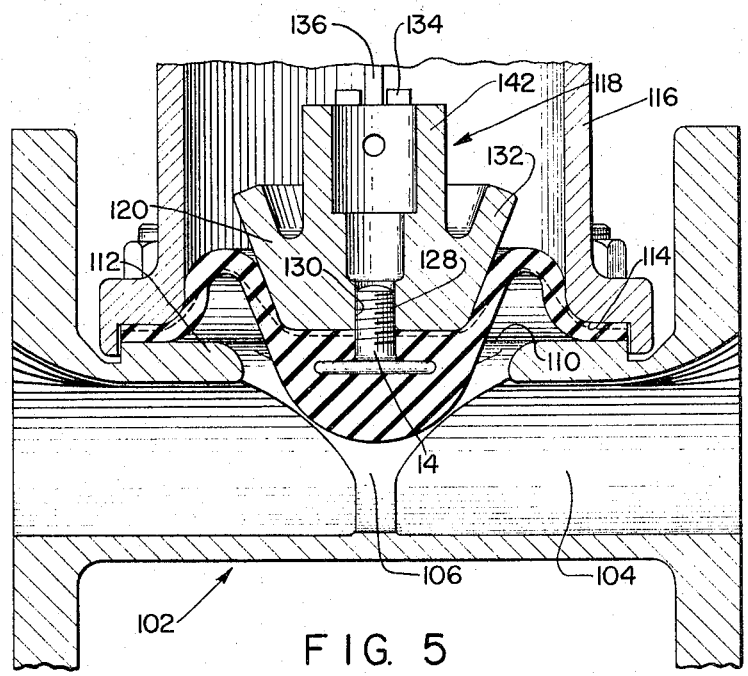
FIGURE 5 is a cross-sectioned side elevation view taken on line 5—5 of FIG. 2.

FIGURES 2 and 4 illustrate particularly well the advantageous combination of a diaphragm having the construction of FIG. 1 with a valve having the proportions of FIGS. 2, 3, and 4. Thus, while it is advantageous to have a diaphragm construction per se like FIG. 1 because it reduces the stresses in the fabric reinforcement, it is also advantageous to combine this diaphragm construction with a valve construction in which there is some rolling-sleeve shape or fold in the intermediate diaphragm portion even when the valve is closed. This maintains stretching of the fabric at a minimum during valve operation, it being kept in mind that the fabric has a lesser radial length than the center plane of the intermediate skirt portion. The valve body construction relative to the diaphragm whereby the intermediate skirt portion is not drawn tightly down into the body opening during closure permits the short-cutting of the fabric without the adverse stretching which would occur if the skirt portion were drawn tightly against a seating during closure and if the fabric layer were shorter radially than the effective skirt portion radial length.

In addition, by avoiding complete removal of the bend 96 the stressing of the resilient material in this location is modest, regardless of the length of the fabric layer 11, because there is not as pronounced a change in bending as in the prior constructions.

Figure 7:
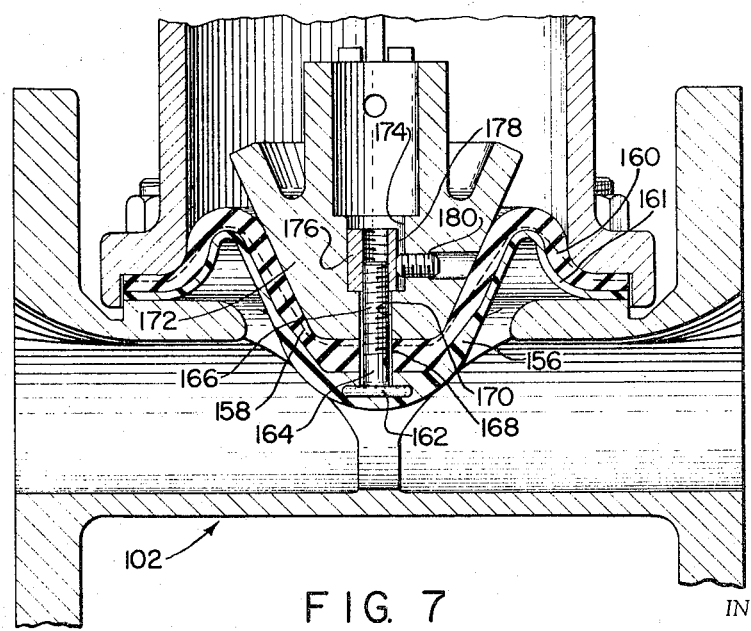
FIGURE 7 is a view like FIG. 5, but showing another embodiment of the invention in which the resilient diaphragm acts as a backing sheet for a thinner plastic diaphragm or facing; and, FIGURE 8 is a partially diagrammatic cross-sectioned side elevation view showing a diaphragm mold loaded and ready for closing to make a diaphragm like those of the other views.

FIGURE 7 shows the present invention adapted to a valve in which the diaphragm is made up of a relatively thin and hard plastic facing 156 and a resilient backing sheet 158 which very much resembles the diaphragm of the earlier views. In this type of valve the backing sheet is provided with the same kind of fabric reinforcement 160 which has been described, and the advantages of the present invention are similar with respect to the location of fabric in the resilient material of the backing sheet. The plastic material of the facing in this construction has no fabric reinforcement, but there is still advantage in the use of its shape in a valve of such dimensions that the bend at 161 is retained even in closed position. The avoidance of reversing this bend, which was reversed in many prior art constructions, makes the flexing conditions in the plastic less severe.

An example of a plastic which is suitable for use in FIG. 7 is polytetrafluoroethylene molded from powder so that the head 162 of the stud 164 can be embedded therein during the plastic molding operation. The stem 166 of the stud passes loosely through an opening 168 in the backing sheet 156 and loosely through a passage 170 in the bottom of the compressor 172 and finally enters a cavity 174 having a cylindrical nut member 176 loosely fitting therein. The stem is threaded into this nut member which has one side 178 faced off and presented toward a set-screw 180 introduced through the side of the compressor. The set-screw is adjusted so that the nut 176 is free to move vertically but cannot rotate. In this way no closing force is exerted on the plastic through the stud, but the stud does serve to connect the diaphragm to the compressor and move the diaphragm assembly with the compressor when the compressor is moved to open the valve.

I claim:
1. The combination of:
    (I) a rigid diaphragm valve body which:
        (A) has a generally cylindrical side wall which:
            (1) encloses a flow passageway,
            (2) has a diaphragm opening which:
                (a) is located in one side of said side wall,
                (b) communicates with said flow passageway,
                (c) has an axis,
        (B) has an annular flange surface which:
            (1) surrounds said diaphragm opening,
            (2) lies in a plane which:
                (a) is generally flat,
                (b) is perpendicular to said axis,
        (C) has a diaphragm seating surface which:
            (1) is within said passageway,
            (2) is opposite said diaphragm opening,
            (3) has a certain shape,
    (II) a deformable diaphragm valve diaphragm which:
        (A) has an outer portion which:
            (1) has a second surface engaging said flange surface,
            (2) has a first surface which:
                (a) is parallel to said outer portion second surface,
                (b) is spaced a certain distance from said outer portion second surface,
        (B) has a central portion which:
            (1) is located:
                (a) apart from said outer diaphragm portion,
                (b) on said axis,
            (2) has a second surface which in the valve closed position:
                (a) engages said diaphragm seating surface on said body,
            (3) has a first surface which:
                (a) is opposite said central portion second surface,
                (b) is spaced from said central portion second surface a distance greater than said certain distance,
                (c) extends in a direction generally radial with respect to said axis,
        (C) an intermediate portion which:
            (1) connects said central portion to said outer portion,
            (2) has a first surface which:
                (a) joins said central portion first surface at a first juncture,
                (b) in the closed position of the valve turns abruptly at said first juncture, in a direction generally along said axis,
                (c) in the closed position of the valve turns abruptly back upon itself at a bend which:
(i) is spaced radially outward from said first juncture with respect to said axis,
(ii) is spaced radially inward from said body flange surface with respect to said axis,
(d) joins said outer portion first surface at a second juncture,
(e) in the closed position of the valve turns abruptly at said second juncture into said outer portion first surface,
(3) has a second surface which:
(a) is opposite said intermediate portion first surface,
(b) is parallel to said intermediate portion first surface,
(c) joins said central portion and outer portion second surfaces,
(D) has a layer of flexible reinforcement material which:
(1) is embedded in said central, intermediate and outer portions,
(2) extends from said central portion through said intermediate portion and into said outer portion,
(3) is substantially closer to said intermediate portion first surface than to said intermediate portion second surface at said first and second junctures,
(4) is substantially closer to said intermediate portion second surface than to said intermediate portion first surface at said bend,
(5) in the closed position of the valve changes direction at said bend,
(E) has a rigid elongated connection member which:
(1) has one portion in said central diaphragm portion,
(2) has another portion projecting from said central diaphragm portion first surface.

2. The combination according to claim 1 wherein said surfaces of said diaphragm portions are surfaces of revolution about said axis.

3. The combination according to claim 2 wherein said diaphragm center portion first surface lies in a substantially flat plane.

4. The combination according to claim 3 wherein said turns in said intermediate portion first surface are smooth curves at said junctures, wherein said intermediate portion second surface has a smooth curve at said bend, wherein said layer of reinforcing material is parallel to said surface curves, and wherein said layer extends substantially straight between said curves.

5. The combination according to claim 4 wherein said layer of reinforcing material extends through said central and outer portions substantially parallel to the first said surfaces thereof.

6. The combination according to claim 5 wherein said seating surface is entirely on one side of said annular flange surface.

7. The combination according to claim 6 wherein said layer of reinforcement material is a sheet of woven cloth.

8. The combination according to claim 7 wherein a diaphragm facing of different material is interposed between said diaphragm and said body, and wherein said connection member has a third portion embedded in said diaphragm facing.

9. The combination according to claim 8 wherein the portions of said facing are substantially less thick than the portions of the diaphragm adjacent thereto.

10. The combination according to claim 9 wherein said facing fits loosely against the second surfaces of the diaphragm central, intermediate and outer portions.

11. The combination according to claim 9 wherein said facing follows the configurations of the said second surfaces of the diaphragm central, intermediate and outer portions.

References Cited by the Examiner
UNITED STATES PATENTS

| | | | |
|---|---|---|---|
| 2,988,322 | 6/1961 | Anderson | 251—331 |
| 3,091,427 | 5/1963 | Boteler | 251—331 X |
| 3,173,342 | 3/1965 | Wilson | 92—103 |
| 3,207,472 | 9/1965 | Seltsam | 251—331 |

M. CARY NELSON, *Primary Examiner.*

ARNOLD ROSENTHAL, *Examiner.*